US008608207B2

(12) United States Patent
Boraas et al.

(10) Patent No.: US 8,608,207 B2
(45) Date of Patent: Dec. 17, 2013

(54) APPARATUS TO MAKE UP MULTIPLE QUICK CONNECT COUPLINGS (75) Inventors: Michael A. Boraas, Zumbrota, MN (US); Eric A. Eckberg, Rochester, MN (US); Scott A. Shurson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/307,539

(22) Filed: Nov. 30, 2011

(65) Prior Publication Data
US 2013/0134702 A1 May 30, 2013

(51) Int. Cl.
*F16L 37/23* (2006.01)
(52) U.S. Cl.
USPC ........................................ 285/124.3
(58) Field of Classification Search
USPC ........ 285/124.1–124.5; 361/699, 700, 679.53
See application file for complete search history.

(56) References Cited

U.S. PATENT DOCUMENTS

| 2,788,991 | A | * | 4/1957 | Neuhauser | 285/18 |
|---|---|---|---|---|---|
| 4,047,281 | A | * | 9/1977 | Di Maio et al. | 29/429 |
| 4,615,546 | A | * | 10/1986 | Nash et al. | 285/26 |
| 4,691,942 | A | | 9/1987 | Ford | |
| 5,139,287 | A | * | 8/1992 | Broere | 285/26 |
| 5,816,621 | A | * | 10/1998 | Frost | 285/1 |
| 6,604,370 | B2 | * | 8/2003 | Bash et al. | 62/171 |
| 6,860,290 | B2 | * | 3/2005 | Knuthson | 137/594 |
| 7,117,892 | B2 | | 10/2006 | Krywitsky | |
| 7,380,409 | B2 | | 6/2008 | Campbell et al. | |
| 7,593,227 | B2 | | 9/2009 | Campbell et al. | |
| 7,686,037 | B2 | | 3/2010 | Krywitsky | |
| 7,701,714 | B2 | * | 4/2010 | Shabany | 361/698 |
| 7,703,812 | B2 | * | 4/2010 | Asam et al. | 285/38 |
| 8,270,164 | B2 | * | 9/2012 | Tang | 361/699 |
| 2006/0065874 | A1 | | 3/2006 | Campbell et al. | |
| 2008/0060373 | A1 | | 3/2008 | Campbell et al. | |
| 2008/0144293 | A1 | * | 6/2008 | Aksamit et al. | 361/727 |

FOREIGN PATENT DOCUMENTS

JP 200335389 * 7/2003 ............ F16L 39/00

OTHER PUBLICATIONS

Eaton Corporation, "Blind-Mate Quick Disconnect Couplings for Electronics Liquid Cooling", Aerospace TF100-33A, Fluid Conveyance—Blind-Mate Quick Disconnect Couplings for Electronics Liquid Cooling, Feb. 2006, pp. 1-4.
IBM, "Improve the Ease-of-Use of Quick Disconnect Water Fittings in Restricted Spaces", IPCOM000153603D, ip.com Prior Art Database, Jun. 4, 2007, cover plus pp. 1-3.
Ralph Remsburg, "Quick Disconnects for Electronic Cooling", reprinted from Machine Design, Irvine, CA, Mar. 23, 1989, vol. 61, No. 6, Table of Contents and 4 pages.

* cited by examiner

*Primary Examiner* — Daniel P. Stodola
*Assistant Examiner* — James Linford
(74) *Attorney, Agent, or Firm* — Cynthia G. Seal; Jeffrey L. Streets (57) ABSTRACT

An apparatus for providing coolant to a computer rack system comprises a first and a second quick disconnect couplings each having a male insert, a female socket aligned with the male insert and a release collar movable on the female socket between a release position and a docked position, a carriage slidably coupled to the chassis to move the male inserts between a retracted position with male inserts separated from the female sockets and a docked position with male inserts inserted into the female sockets. A resilient member intermediate the chassis and the release collars assists in moving the release collars from the release position to the docked position to make up a fluidic circuit. A collar stop coupled to the chassis and aligned with the release collars engages and moves the release collars from the docked position to the release position to break out the fluidic circuit.

16 Claims, 6 Drawing Sheets

APPARATUS TO MAKE UP MULTIPLE QUICK CONNECT COUPLINGS

BACKGROUND

1. Field of the Invention

The present invention relates to connecting and disconnecting fluidic conduits. More specifically, the present invention relates to connecting and disconnecting fluidic conduits having quick disconnect couplings.

2. Background of the Related Art

Heat-generating computer system components, such as processors, are generally supported within a chassis, such as a server rack, to provide efficient storage and accessibility for component installation and removal. In high heat-density systems, a coolant such as water may be provided from a coolant source and flow through a supply conduit to one or more heat exchangers disposed within or adjacent to the chassis. The coolant may be continuously warmed at the one or more heat exchangers, and the warmed coolant may be returned to the coolant source through a return conduit or released without recirculation. Where warmed coolant is returned to the coolant source, the returned coolant may be cooled by a regenerator, such as a cooler or refrigeration system, so that the regenerated coolant may be circulated back through the supply conduit. The supply conduit and the release or return conduit are portions of a fluidic circuit.

In conventional fluidic circuits for coolant systems, the supply conduit and the release or return conduit may include fluidic couplings, such as mating threaded fittings or mating flanges, that facilitate the connection of fluid conduits that deliver the fluid to one or more heat exchangers in the chassis. Threaded and flanged fittings generally take a large amount of time and effort to make up (connect) and break out (disconnect). An alternate type of coupling is a quick disconnect coupling comprising a male insert that is releasably receivable in a female socket to sealably and fluidically couple a first portion of a conduit connected to the male insert to a second portion of a conduit connected to the female socket. Used in this manner, a first quick disconnect coupling may be used to connect a fluid coolant supply conduit to an inlet conduit to one or more heat exchangers within a chassis and a second quick disconnect coupling may be used to connect a fluid coolant release/return conduit to an outlet conduit from the one or more heat exchangers. In this manner, first and second quick disconnect couplings may be used to quickly provide a fluidic circuit to remove heat produced by heat-generating electronic components within the chassis.

Although connecting and disconnecting quick disconnect couplings requires less time than conventional fluidic couplings, a substantial amount of effort and time may still be required to make up a pair of quick disconnect couplings to enable the fluidic circuit, especially if the quick disconnect couplings are disposed in a location that is difficult to access such as at the back of a computer chassis. For example, a user may have to align a first male insert with a first female socket, insert the first male insert into the first female socket, secure the quick disconnect coupling by sliding a release collar on the female socket to a docked position, and then repeat the process on a second conduit to complete the fluid circuit.

BRIEF SUMMARY

In one embodiment of the present invention, an apparatus comprises a first quick disconnect coupling having a first male insert receivable within a first female socket with a first release collar movable along a portion of the first female socket between a release position and a docked position, a second quick disconnect coupling having a second male insert receivable within a second female socket with a second release collar movable along a portion of the second female socket between a release position and a docked position, a carriage connected to the first and second male inserts and movable on a chassis, and a resilient member intermediate the chassis and the first and second release collars, wherein movement of the carriage in a first direction from a retracted position to an engaged position inserts the first and second male inserts into the first and second female sockets, and wherein subsequent movement of the first and second release collars from the release position to the docked position makes up the first and second quick disconnect couplings by securing the first and second male inserts within the first and second female sockets.

In another embodiment of the present invention, an apparatus comprises a chassis, a carriage slidably movable on the chassis between a retracted position and an engaged position, a first male insert coupled to the carriage and having an axis, a second male insert coupled to the carriage and having an axis, a first female socket coupled to the chassis and having a first release collar movable along an axis generally aligned with the first male insert and along a portion of the first female socket between a release position and a docked position, a second female socket coupled to the chassis and having a second release collar movable along an axis generally aligned with the second male insert and along a portion of the second female socket between a release position and a docked position, a resilient member intermediate the chassis and the first and second release collars, and a collar stop aligned to engage and limit the range of movement of the first and second release collars, wherein the carriage is movable in a first direction from the retracted position to the engaged position to insert the first and second male inserts into the first and second female sockets, wherein the first and second male inserts are subsequently releasably securable within the first and second female sockets by movement of the first and second release collars from the release position to the docked position to make up first and second quick disconnect couplings, and wherein the carriage is subsequently movable in a second direction opposite the first direction to engage the first and second release collars with the collar stop and displace the first and second release collars from the docked position to the release position to release the first and second male inserts from the first and second female sockets to break out the first and second quick disconnect couplings.

DETAILED DESCRIPTION

One embodiment of the present invention provides an apparatus to make up first and a second quick disconnect couplings, for example to provide a fluid circuit to circulate coolant to a heat exchanger within a computer chassis. The coolant fluid circuit may be used to remove heat produced by heat-generating electronic components using, for example, a rear door heat exchanger. The apparatus comprises two quick disconnect couplings, each having a male insert connected to a carriage and each having a female socket connected to a chassis, wherein the carriage is movably coupled to the chassis to maintain the male inserts and the female sockets in a generally axially aligned configuration. The apparatus facilitates making up of the first and second quick disconnect couplings by moving the carriage relative to the chassis to insert the male inserts into the female sockets, then by moving release collars on the female sockets from a release position to a docked position such that the male inserts are secured within the female sockets. The apparatus also facilitates disconnection of the male inserts from the female sockets by moving the carriage so that the made up couplings coupled thereto engage a collar stop and displace the release collar on each female socket from the docked position to the release position that releases the male inserts from the female sockets.

In one embodiment of the apparatus, a first male insert and a second male insert are connected to the carriage and in alignment with a first female socket and a second female socket, respectively, that are coupled to the chassis. The carriage supporting the first and second male inserts is movable relative to the chassis between a retracted position with the male inserts separated from the female sockets and an inserted position with the male inserts inserted into the female sockets. The carriage may be slidably coupled to the chassis, for example using a drawer slide, guide ears, or a track-and-follower guide such as a tongue-in-groove guide or a key-in-slot guide. The female sockets each comprise a release collar movable along a portion of the female socket between a release position and a docked position to secure the male insert in an inserted position within the aligned female socket. The carriage may be moved in a first direction from the retracted position to the engaged position to insert the first and second male inserts into the first and second female sockets, respectively. A resilient member, such as a spring, is disposed intermediate an end of the chassis and the first and second release collars, and the application of force to the carriage toward the female sockets, with the male inserts inserted into the female sockets, causes the chassis to engage the release collars through the resilient member to displace the release collars from the release position to the docked position to secure the male inserts in the inserted position within the female sockets and to thereby make up the male inserts and the female sockets into the first and a second quick disconnect couplings.

The apparatus may be used to provide a fluidic circuit by fluidically coupling a heat exchanger portion of a first conduit connected to the first male insert to a source portion of the first conduit connected to the first female socket, and by fluidically coupling a heat exchanger portion of a second conduit connected to the second male insert to a release/return portion of the second conduit connected to the second female socket. The making up of these fluidic connections provides a fluidic circuit to deliver a supply of coolant from the source portion of the first conduit, through the first quick disconnect coupling and the heat exchanger portion of the first conduit to a heat exchanger disposed, for example, on a rear door of a computer chassis to remove heat from air exiting the computer chassis across the heat exchanger. The warmed coolant leaving the heat exchanger moves through the heat exchanger portion of the second conduit, the second quick disconnect coupling and the release/return portion of the second conduit to either a release dump or a regeneration system to remove heat from the warmed coolant for re-circulation through the fluidic circuit.

Optionally, in one embodiment of the apparatus of the present invention, a first resilient member may be disposed intermediate the chassis and the first female socket and a second resilient member may be disposed intermediate the chassis and the second female socket, so that the first and second resilient members are disposed to engage and displace the first and second release collars along the first and second female sockets, respectively, to secure the first and second male inserts in the first and second female sockets. The resilient member(s) may comprise a spring(s), such as a coil spring(s), a rubber or elastomeric material, or a combination thereof.

The apparatus may further comprise a collar stop coupled to the chassis and positioned to engage and displace the release collars on the first and second quick disconnect couplings from the docked position to the release position to disconnect the male inserts from the female sockets and to break out the fluidic circuit provided as described above. It will be understood that movement of the carriage in a second direction relative to the chassis, opposite the first direction, with the male inserts secured within the female sockets will cause the made up quick disconnect couplings and the source portion of the first conduit and the release/return portion of the second conduit to move with the carriage until the quick disconnect couplings are broken out. In one embodiment, the collar stop may be disposed generally intermediate between the release collars and the carriage and the collar stop may be aligned with the release collars on the female sockets. The carriage may be moved in the second direction to engage the release collars with the collar stop. Further movement of the carriage in the second direction causes the collar stop to displace the release collars from the docked position to the release position to release the male inserts from the female sockets to break out the quick disconnect couplings and interrupt the fluidic circuit. In one embodiment, the collar stop may comprise a plate having a first aperture through which a portion of the first female socket extends and a second aperture through which a portion of the second female socket extends, and the first and second aperture may be strategically sized to align the portions of the first and second female sockets with the axis of the first and second male inserts. Such alignment facilitates insertion of the male inserts into the female sockets upon movement of the carriage in the first direction and facilitates displacement of the release collars from the docked position to the release position upon movement of the carriage in the second direction.

It will be further understood that the male inserts and the female sockets may each contain a valve element having an open position and a closed position, and that the valve elements may be positioned within each of the male inserts and the female sockets to remain in a closed position until the male inserts are inserted into the female sockets to open the valve elements. When the valve elements are in the open position, the source portion of the first conduit is in fluid communication with the heat exchanger portion of the first conduit and the release/return portion of the second conduit is in fluid communication with the heat exchanger portion of the second conduit. This arrangement isolates coolant in the heat exchanger portion of the first conduit, the heat exchanger portion of the second conduit and the heat exchanger therebetween. The valve elements also isolate the coolant in the source portion of the first conduit and in the release/return portion of the second conduit to prevent coolant leakage when the quick disconnect couplings are in the broken out configuration.

An embodiment of the apparatus may comprise a first male insert and a second male insert connected to a common carriage to facilitate simultaneous movement of the first and second male inserts to connect or disconnect the quick disconnect couplings. Alternatively, an embodiment of the apparatus may comprise a first male insert connected to a first carriage and a second male insert connected to a second carriage. In an alternative embodiment, a first carriage may be releasably connectable to a second carriage so that the first and second carriages move as a unit.

Figure 1:
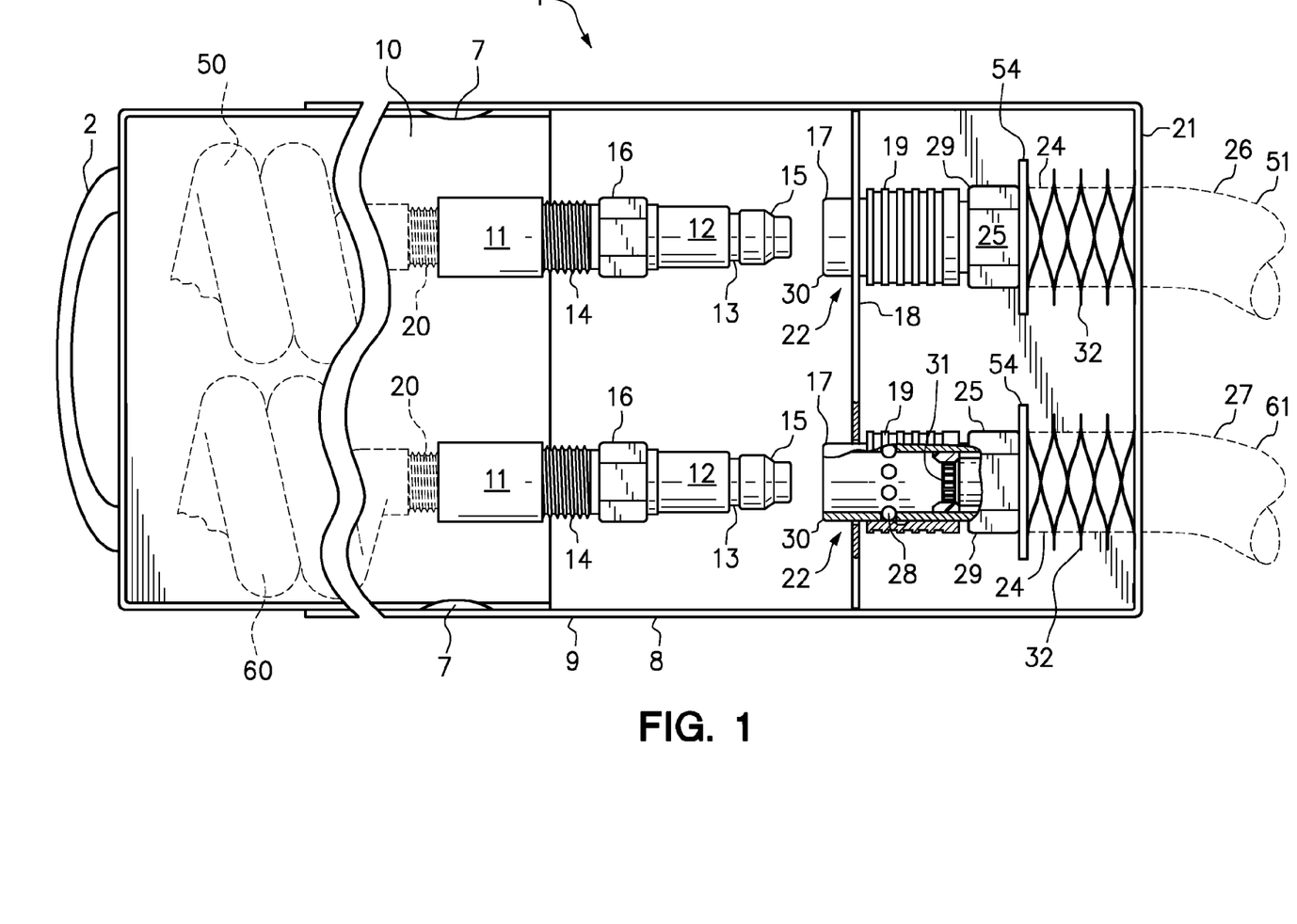
FIG. 1 is a plan view of an embodiment of an apparatus of the present invention having a carriage in a retracted position to support male inserts thereon in alignment with female sockets.

FIG. 1 is a plan view of an embodiment of fluidic conduit docking apparatus 4 of the present invention having a carriage 10 in a retracted position and supporting male inserts 12 axially aligned with and separated from female sockets 17 on a chassis 8. The carriage 10 has a handle 2 to facilitate generally translational movement of the carriage 10 relative to the chassis 8. The carriage 10 is retained in slidable engagement with the chassis 8 for example by a guide comprising a plurality of slide ears 7 on the chassis 8 formed by cutting and bending portions of the wall 9 of the chassis 8 to protrude at a right angle to the wall 9. The carriage 10 is movable relative to the chassis 8 between a retracted position illustrated in FIG. 1 and an engaged position discussed below in connection with FIGS. 3 and 4.

Male inserts 12 are coupled to the carriage 10 in a side-by-side configuration, but the side-by-side configuration of the male inserts 12 is not required. The male inserts 12 comprise tapered portions 15, grooves 13 and connector nuts 16 with internal threads (not shown) to couple the male inserts 12 to insert nipples 14. The insert nipples 14 are threadably coupled to carriage conduits 11 that are, in turn, threadably coupled to carriage nipples 20 to facilitate fluidic communication between the top male insert 12 in FIG. 1 and a heat exchanger portion 50 of a supply conduit 51 and between the bottom male insert 12 in FIG. 1 and a heat exchanger portion 60 of the release/return conduit 61. It will be understood that a unitary member may be substituted for the combination of the male insert 12, the connector nut 16, the insert nipple 14, the carriage conduit 11 and the carriage nipple 20, but these items may facilitate substitution of the size of the male inserts 12 for male inserts of a different size to engage and dock with a female sockets 17 of a different size or the substitution of heat exchanger portions 50, 60 of a different size.

The female sockets 17 may be releasably docked with the male inserts 12 to make up quick disconnect couplings. A release collar 19 is movable on each female socket 17 between a release position (illustrated in FIG. 1) and a docked position discussed below in connection with FIG. 4. The top female socket 17 is coupled to the end 24 of first portion 26 of the supply conduit 51 and the bottom female socket 17 is coupled to the end 24 of the first portion 27 of the release/return conduit 61. The end 24 of the first portion 26 of the supply conduit 51 and the end 24 of the first portion 27 of the release/return conduit 61 are each extended through a bore of a spring 32 and through the bore of an adjacent sleeve 25. The spring 32 and sleeve 25 are disposed intermediate an end 21 of the chassis 8 and the female sockets 17. Each sleeve 25 comprises a face 29 sized to engage and displace the release collar 19 along the female socket 17 from the release position of FIG. 1 to a docked position discussed below in connection with FIG. 4. The sleeve 25 comprises a flange portion 54 sized to engage the adjacent spring 32.

A collar stop 18 is secured to the chassis 10 at a selected distance from the end 21 of the chassis 10 with the female sockets 17, sleeves 25 and springs 25 therebetween. Each female socket 17 comprises a nose 30, and the collar stop 18 is spaced from the end 21 of the chassis 10 so that the nose 30 of the female socket 17 protrudes through an aperture 22 in the collar stop 18. The aperture 22 is strategically sized to receive the nose portion 30 therein to align the female socket 17 with the male insert 12, and the aperture 22 is small enough to engage and prevent passage of the release collar 19 through the aperture 22 as will be discussed in connection with FIG. 5. This arrangement provides for a limited range of movement of the release collar 19 relative to the chassis 8, where the release collar 19 is disposed to move within a range permitted by the sleeve 25, the spring 32 and the end 21 of the chassis 8 in a first direction (to the right in FIG. 1) and by the aperture 22 in the collar stop 18 in the second, opposite direction (to the left in FIG. 1).

Figure 2:
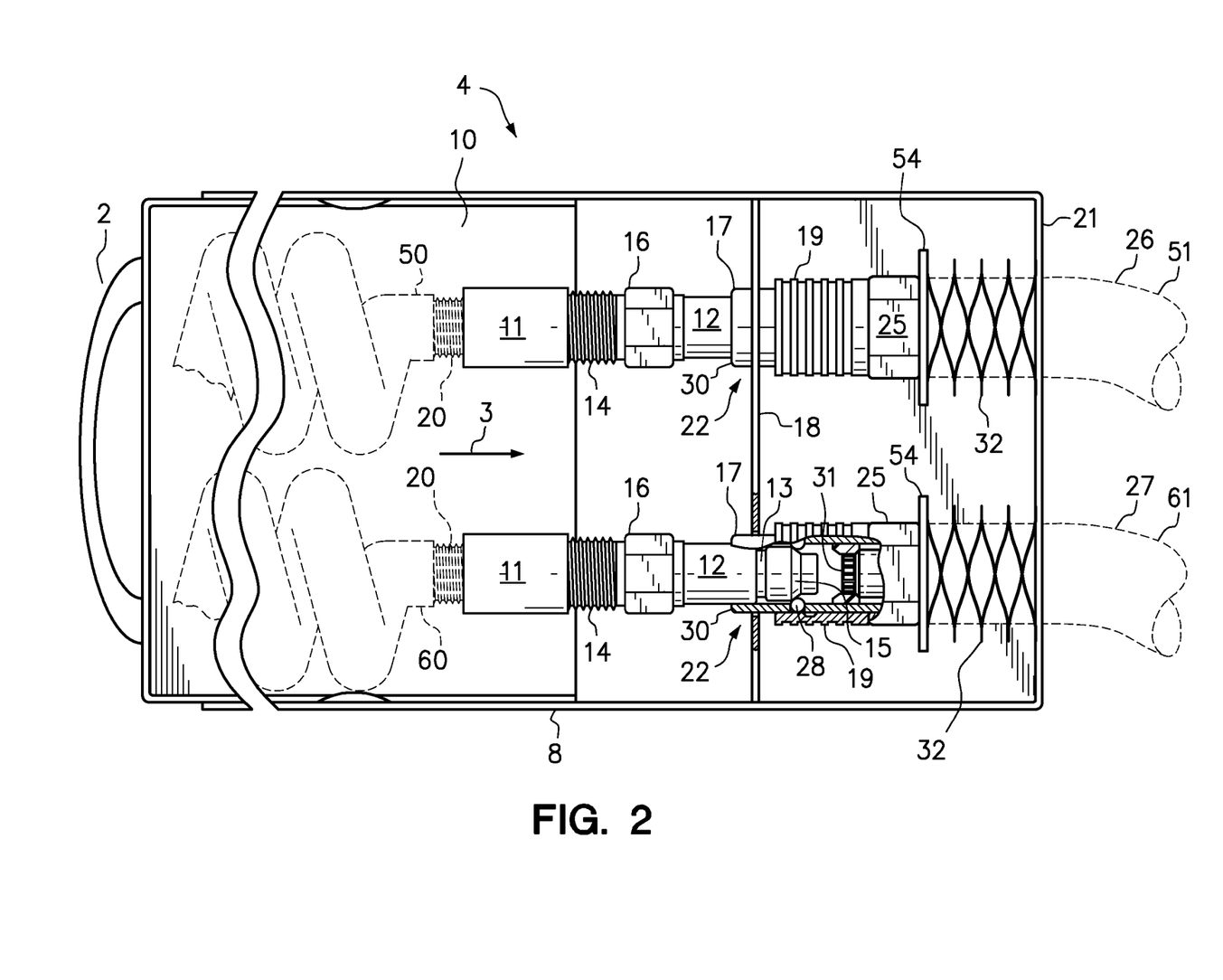
FIG. 2 is a plan view of the apparatus of FIG. 1 upon movement of the carriage and the male inserts received with the aligned female sockets.

FIG. 2 is a plan view of the apparatus 4 of FIG. 1 upon application of force to the handle 2 to move the carriage 10 and the male inserts 12 thereon in the direction of arrow 3 to insert the male inserts 12 into the aligned female sockets 17. The bottom female socket 17 on FIG. 2 is shown in a partial cross-sectional view through a portion of the release collar 19 and the female socket 17 to reveal details of the engagement. The tapered portion 15 of the male insert 12 engages and displaces ball bearings 28 radially outwardly within the female socket 17. The release collars 19 remain in the release position in FIG. 2, and the male insert 12 is shown as approaching, but not yet engaging, a valve element 31 within the female socket 17, which valve element 31 remains in a closed position to isolate the first portion 27 of the release/return conduit 61.

Figure 3:
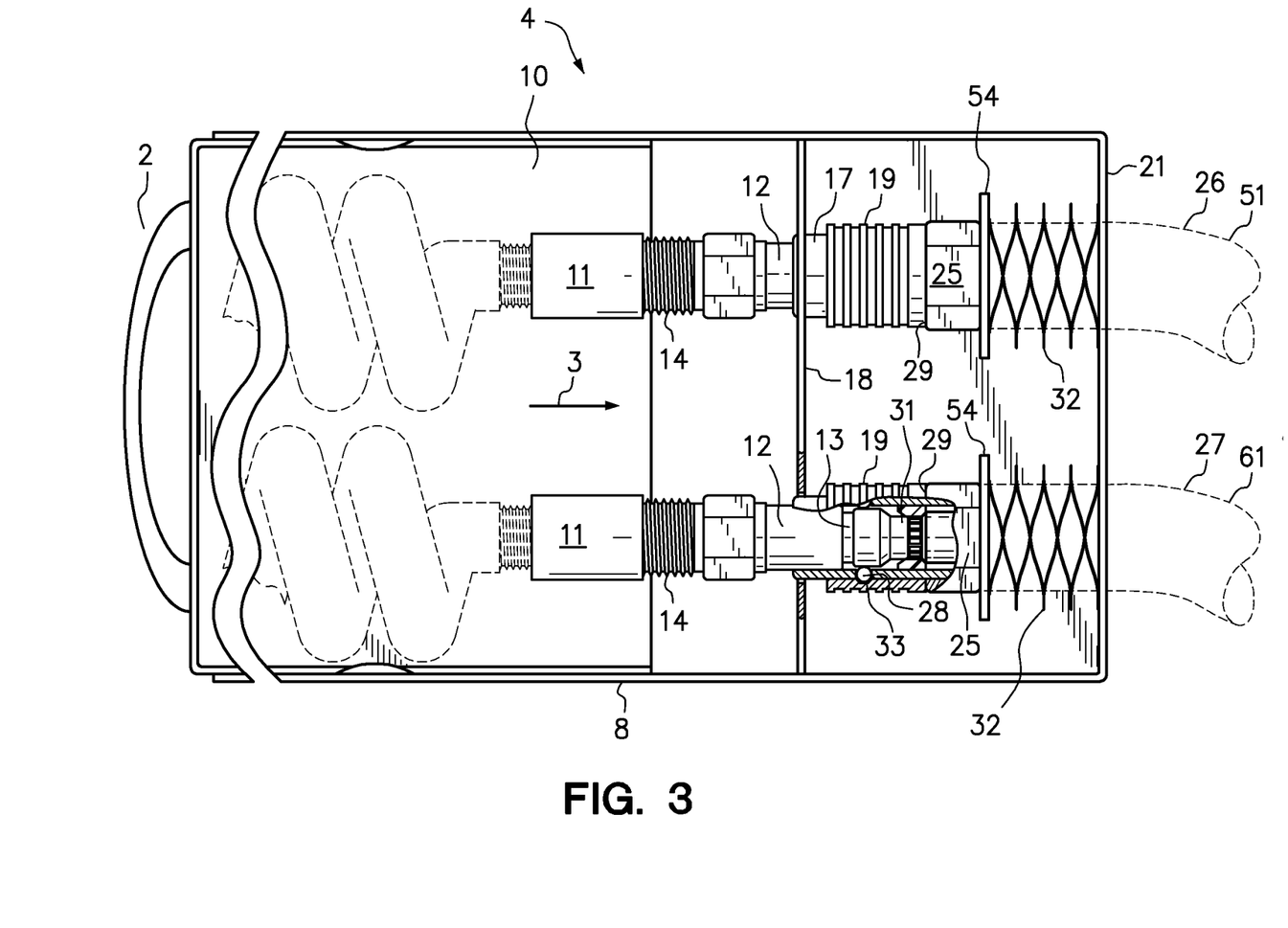
FIG. 3 is a plan view of the apparatus of FIG. 2 with the carriage moved to position the male inserts in a docked position within the female sockets.

FIG. 3 is a plan view of FIG. 2 after movement of the carriage 10 further in the direction of arrow 3 to position male inserts 12 in the docked position within female sockets 17 to engage and open valve element 31 thereby fluidically connecting male inserts 12 with the first portion 27 of the release/return conduit 61. The release collars 19 remain in the release position and the ball bearings 28 of the bottom female socket 17 are disposed within a release collar groove 33 within the interior bore of the release collar 19. The ball bearings 28 are positioned adjacent to, but not received within, the male insert groove 13 on the exterior of the male insert 12. It should be noted that upon engagement of the male insert 12 with the valve element 31, and the resulting opening of the valve element 31, the female socket 17 is displaced from its position in FIG. 2 towards the end 21 of the chassis 8 by the force applied by the male insert 12 to the valve element 31 and ball bearings 28. Upon displacement of the female socket 17, the release collar 19 on the female socket 17 moves to engage the face 29 of the sleeve 25 and to dispose the flange portion 54 of the sleeve 25 against the spring 32. It will be understood that further displacement of the male inserts 12 once docked within the female socket 17 as illustrated in FIG. 3 will cause compression of the spring 32 between the flange 54 and the end 21 of the chassis 8.

Figure 4:
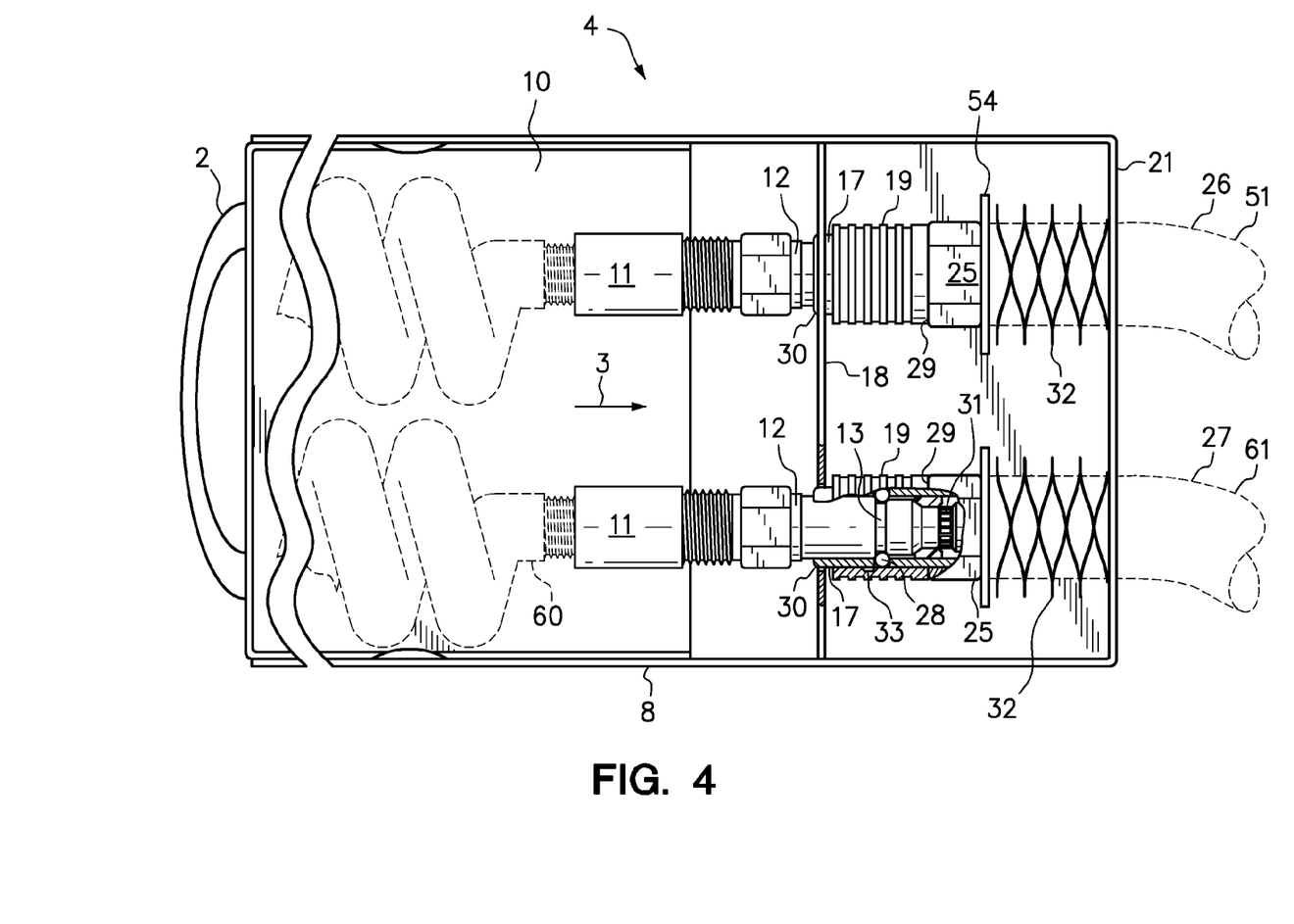
FIG. 4 is a plan view of the apparatus of FIG. 3 after a release collar on each of the female sockets is moved from a release position to a docked position to secure the male inserts within the female sockets to make up quick disconnect couplings and provide a fluidic circuit.

FIG. 4 is a plan view of FIG. 3 after movement of the carriage 10 further in the direction of arrow 3 to displace the male inserts 12 and the female sockets 17 into which the male inserts 12 are docked towards the end 21 of the chassis 8. The resulting compression of the springs 32 displaces the sleeves 25 which engage and move the release collars 19 from the release position and along the female sockets 17 to the docked position of FIG. 4. The movement of the release collar 19 disposes the ball bearings 28 into the male insert groove 13 on the male insert 12 to capture the ball bearings 28 between the male insert groove 13 and the interior bore of the release collar 19 adjacent the release collar groove 33. The configuration of the release collar 19, female socket 17, male insert 12, and ball bearings 28 illustrates the fully docked configuration of the quick disconnect couplings with the valve elements 31 open and the release collars 19 in the docked position.

The configuration of the apparatus 4 illustrated in FIG. 4 is the condition under which the fluidic conduit docking apparatus 4 provides a fluidic circuit for circulating a coolant from, for example, a coolant source (not shown) through the first portion 26 of the source conduit 51, the female socket 17, the male insert 12, the carriage conduit 11, and the heat exchanger portion 50 of the source conduit 51, to the heat exchanger (not shown), from which the fluidic circuit will return the warmed coolant through the heat exchanger portion 60 of the release/return conduit 61, the carriage conduit 11, the male insert 12, the female socket 17 and the first portion 27 of the release/return conduit 61. The coolant may be discharged to a release destination or regenerated and re-used. In one use of the apparatus 4, the coolant may be tap water, the source may be a city water supply and the discharge destination may be an irrigation system or a garden.

The apparatus 4 may require disengagement to interrupt the fluidic circuit. The embodiment of the fluidic conduit docking apparatus 4 of FIGS. 1-4 is adapted for disengagement as described below in connection with FIGS. 5 and 6.

Figure 5:
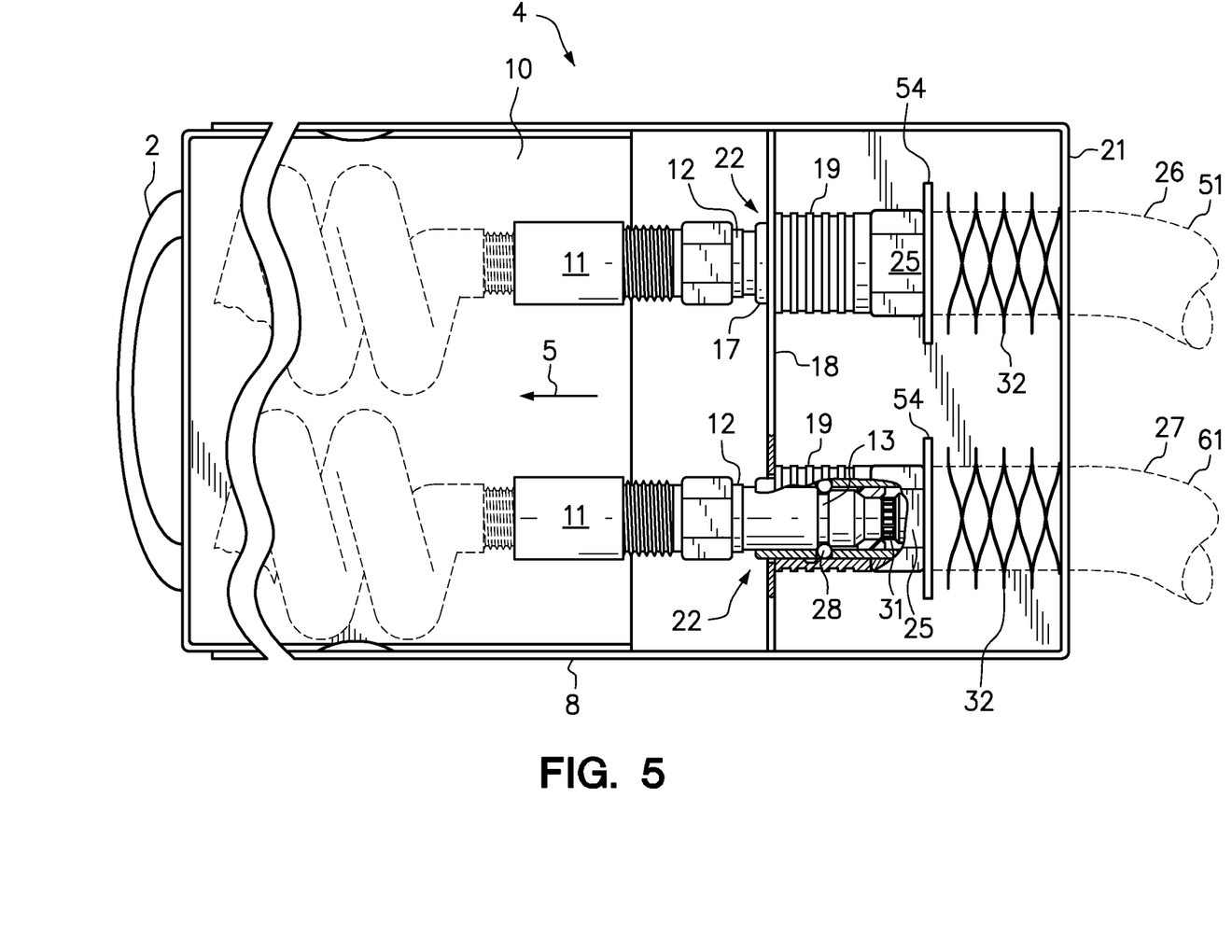
FIG. 5 is a plan view of the apparatus of FIG. 4 during disconnection of the quick disconnect couplings, after the carriage and the quick disconnect couplings have been moved to engage the release collars with a collar stop.

FIG. 5 is a plan view of FIG. 4 after a force is applied to handle 2 to displace the carriage 10, the male inserts 12 thereon, the female sockets 17 coupled thereto and the first portions 26, 27 of the source conduit 51 and the release/return conduit 61 coupled to the female sockets 17 all in the direction of the arrow 5 to engage the release collars 19 against the collar stop 18. The apertures 22 in the collar stop 18 are sized to allow the nose 30 of the female sockets 17 to move beyond the collar stop 18 while the release collar 19 on the female sockets 17 engages the collar stop 18. As a result, the application of a force to the handle 2 to move the carriage 10 in the direction of the arrow 5 causes the collar stop 18 to engage and displace the release collar 19 relative to the female socket 17 from the docked position of FIG. 4 to the release position of FIG. 6.

Figure 6:
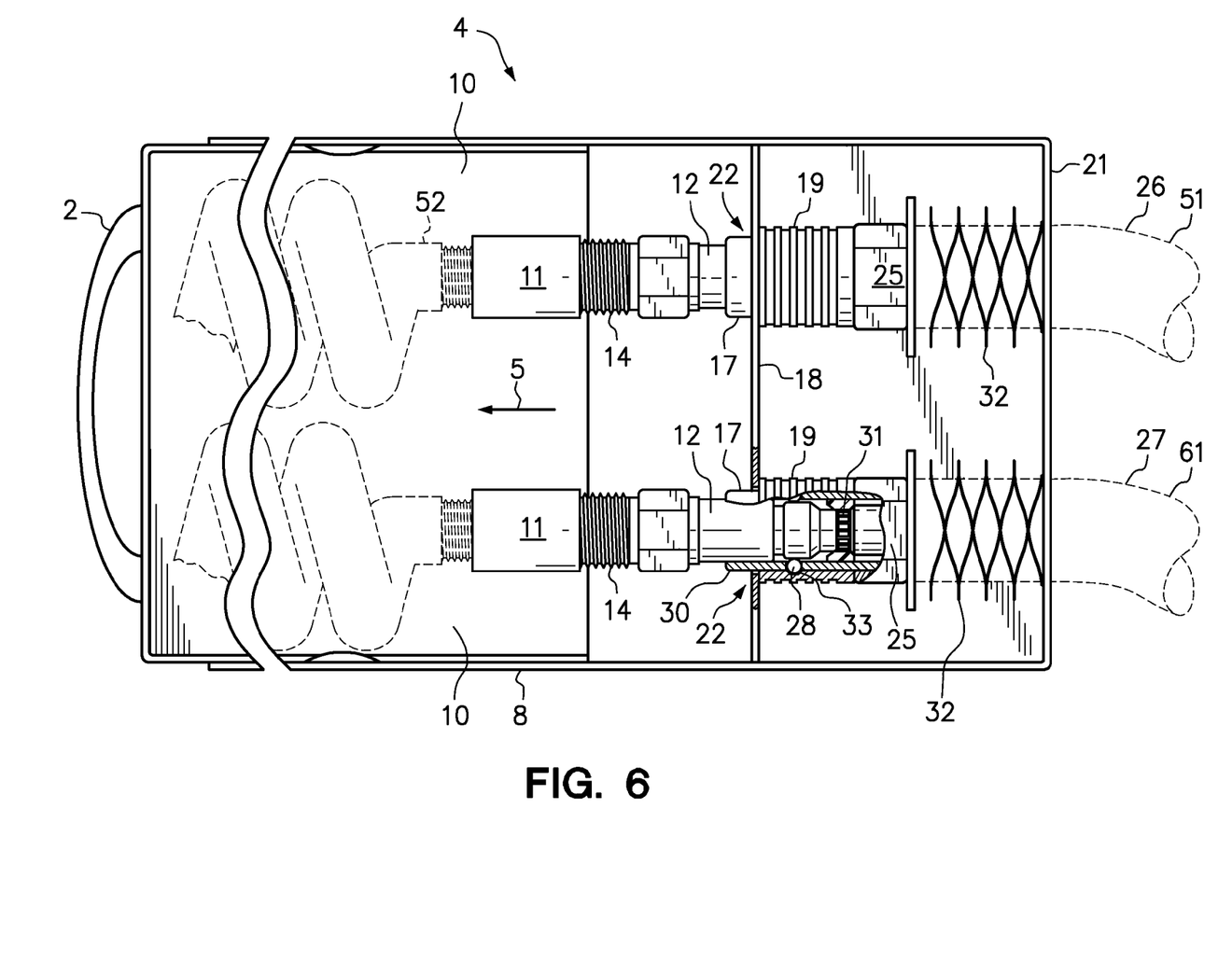
FIG. 6 is a plan view of the apparatus of FIG. 5 after the release collars are moved from the docked position to the release position to release the male inserts from the female sockets to break out the quick disconnect couplings and interrupt the fluidic circuit.

With continued movement of the carriage 10 in the direction of arrow 5 after engagement of the release collars 19 with the collar stop 18, the release collars 19 are displaced along the female sockets 17 from the docked position to the release position of FIG. 6. It will be understood that, intermediate the position of the release collar 19 in FIG. 4 and the position of the release collar 19 in FIG. 6, the release collar groove 33 in the release collar 19 will be aligned with the male insert groove 13 to receive the ball bearings 28 from the male insert groove 13 into the release collar groove 33.

FIG. 6 is a plan view of FIG. 5 after the release collars 19 are displaced from the docked position to the release position, the ball bearings 28 are removed from the male insert groove 13, and the male insert 12 is released from female socket 17. It will be understood that further movement of the carriage 10 in the direction of the arrow 5 will disengage the male insert 12 from the valve element 31, thereby isolating the first portion 27 of the release/return conduit 61, and will withdraw the male insert 12 from the female socket 17.

It should be understood that many variations of quick disconnect fluid couplings may be used in connection with embodiments of the present invention, and these variations may provide different configurations of valve elements, release collars, ball bearings, male inserts and female sockets. The embodiment illustrated in FIGS. 1-6 merely illustrates the use of one embodiment of the apparatus to couple and decouple quick disconnect fluid couplings, and should not be considered as limiting of the invention, which is limited only the by the claims that follow. For example, but not by way of limitation, those familiar with quick disconnect fluid couplings will understand that, in some variations of quick disconnect couplings that may be used in connection with embodiments of the present invention, the female sockets 17, 27 may comprise a release collar latch (not shown) that retains the release collar in the release position until the release collar latch is disengaged by insertion of the male insert to a fully docked position within the female socket.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
 a first quick disconnect coupling having a first male insert receivable within a first female socket with a first release collar movable along a portion of the first female socket between a release position and a docked position;
 a second quick disconnect coupling having a second male insert receivable within a second female socket with a second release collar movable along a portion of the second female socket between a release position and a docked position;

a carriage secured to the first and second male inserts and engaging a chassis which houses the female socket, wherein the carriage is slidably movable relative to the chassis;

a plurality of resilient members intermediate a first end of the chassis and the first and second release collars, wherein the resilient members are in abutment with an inner surface of the first end of the chassis, and wherein each of the resilient members are axially aligned with their respective female socket; and a collar stop secured to and in abutment with inner surfaces of the chassis at a selected distance from the first end of the chassis and generally aligned with the release collars of the first and second quick disconnect couplings;

wherein each of the first and second female sockets have a nose that extends through the collar stop toward the male inserts, wherein the resilient members apply longitudinal forces, with respect to the chassis, to each of their respective female socket causing the noses of the female sockets to protrude through the collar stop, wherein movement of the carriage in a first direction toward the first end of the chassis from a retracted position to an engaged position inserts the first and second male inserts into the first and second female sockets and compresses the resilient member, and wherein the compressed resilient member causes subsequent movement of the first and second release collars from the release position to the docked position to make up the first and second quick disconnect couplings by securing the first and second male inserts within the first and second female sockets, and wherein movement of the carriage in a second direction opposite the first direction engages the release collars with the collar stop allowing the first and second quick disconnect couplings to move from the docked position to the release position.

2. The apparatus of claim 1, further comprising:
a guide on the chassis to retain the carriage in slidable engagement with the chassis between the retracted position and the engaged position.

3. The apparatus of claim 2, wherein the guide comprises at least one of a drawer slide, a tongue-in-groove coupling and a track-and-follower coupling.

4. The apparatus of claim 1, wherein the collar stop comprises a first aperture through which a portion of the female socket of the first quick disconnect coupling extends and a second aperture through which a portion of the second female socket of the second quick disconnect coupling extends.

5. The apparatus of claim 1, wherein the female sockets of the first and second quick disconnect couplings each comprise one or more ball bearings and the male inserts of the first and second quick disconnect couplings each comprise an external groove to receive at least a portion of the one or more ball bearings in the female sockets of the first and second quick disconnect couplings, respectively, when the release collars are in the docked position.

6. The apparatus of claim 5, wherein the release collars on the female sockets of the first and second quick disconnect couplings each comprise an internal groove to receive at least a portion of the one or more ball bearings in the female sockets of the first and second quick disconnect couplings, respectively, when the release collars are in the release position.

7. The apparatus of claim 1 wherein the resilient member comprises one or more springs.

8. The apparatus of claim 1 wherein the chassis comprises a first aperture to receive a coolant source conduit and a second aperture to receive a coolant release/return conduit.

9. An apparatus, comprising:
a chassis having a first end;
a carriage engaging the chassis and slidably movable relative to the chassis between a retracted position and an engaged position;
a first male insert coupled to the carriage and having an axis;
a second male insert coupled to the carriage and having an axis;
a first female socket coupled to the chassis and having a first release collar movable along an axis generally aligned with the first male insert and along a portion of the first female socket between a release position and a docked position;
a second female socket coupled to the chassis and having a second release collar movable along an axis generally aligned with the second male insert and along a portion of the second female socket between a release position and a docked position;
a plurality of resilient members intermediate the first end of the chassis and the first and second release collars, wherein the resilient members are in abutment with an inner surface of the first end of the chassis, and wherein each of the resilient members are axially aligned with their respective female socket; and
a collar stop secured to and in abutment with inner surfaces of the chassis at a selected distance from the first end of the chassis and aligned to engage and limit the range of movement of the first and second release collars;
wherein each of the first and second female sockets have a nose that extends through the collar stop toward the male inserts, wherein the resilient members apply longitudinal forces, with respect to the chassis, to each of their respective female socket causing the noses to protrude through the collar stop;
wherein the carriage is slidably movable in a first direction from the retracted position to the engaged position to insert the first and second male inserts into the first and second female sockets;
wherein the first and second male inserts are releasably securable within the first and second female sockets by the resilient member causing movement of the first and second release collars from the release position to the docked position to make up a first and second quick disconnect couplings; and
wherein the carriage is slidably movable in a second direction opposite the first direction to engage the first and second release collars with the collar stop to displace the first and second release collars from the docked position to the release position to release the first and second male inserts from the first and second female sockets to break out the first and second quick disconnect couplings.

10. The apparatus of claim 9, further comprising:
a guide on the chassis to retain the carriage in sliding engagement with the chassis.

11. The apparatus of claim 10, wherein the guide is selected from a drawer slide, a tongue-in-groove guide and a track-and-follower guide.

12. The apparatus of claim 9, wherein the collar stop comprises:
a first aperture through which a portion of the first female socket extends; and
a second aperture through which a portion of the second female socket extends.

13. The apparatus of claim 9, wherein the first and second female sockets each comprise one or more ball bearings and the first and second male inserts each comprise an external groove to receive at least a portion of the one or more ball bearings when the release collar is in the docked position.

14. The apparatus of claim 13, wherein the release collars on each of the first and second female sockets comprise an internal groove to receive one or more ball bearings when the release collar is in the release position.

15. The apparatus of claim 9, wherein the resilient member is one or more springs.

16. The apparatus of claim 9, wherein the first end of the chassis comprises a first aperture to receive a coolant source conduit and a second aperture to receive a coolant release return conduit.

\* \* \* \* \*